United States Patent
Goma et al.

(10) Patent No.: US 7,542,168 B2
(45) Date of Patent: Jun. 2, 2009

(54) GRADATION CONVERSION CALIBRATION BY COMPARING GRAYSCALE AND COLOR CHART MEASUREMENTS TO TARGET VALUES AND REPEATED CORRECTION AMOUNT CALCULATIONS TO TOLERANCE VALUES

(75) Inventors: Tatsuji Goma, Wakayama (JP); Yoshiyuki Nakatani, Wakayama (JP); Takeshi Nishihara, Wakayama (JP)

(73) Assignee: Noritsu Koki Co., Ltd., Wakayama (JP)

( * ) Notice: Subject to any disclaimer, the term of this patent is extended or adjusted under 35 U.S.C. 154(b) by 626 days.

(21) Appl. No.: 11/401,063

(22) Filed: Apr. 10, 2006

(65) Prior Publication Data

US 2006/0227397 A1     Oct. 12, 2006

(30) Foreign Application Priority Data

Apr. 12, 2005     (JP)     ............................. 2005-114635

(51) Int. Cl.
    *H04N 1/60*     (2006.01)
(52) U.S. Cl. .................... 358/1.9; 358/504; 358/521
(58) Field of Classification Search ................ 358/1.9, 358/3.01, 3.21–3.24, 504, 518, 519, 521, 358/523, 406, 461
    See application file for complete search history.

(56) References Cited

U.S. PATENT DOCUMENTS

| 6,148,158 A * | 11/2000 | Amemiya ................... 358/521 |
| 7,069,164 B2 * | 6/2006 | Viturro et al. ................ 358/1.9 |
| 7,417,763 B2 * | 8/2008 | Saito ........................... 358/1.9 |
| 2003/0234946 A1 * | 12/2003 | Saito ........................... 358/1.9 |
| 2004/0046981 A1 * | 3/2004 | Taka et al. .................... 358/1.9 |
| 2004/0057062 A1 * | 3/2004 | Harada et al. ................ 358/1.9 |
| 2004/0130737 A1 * | 7/2004 | Kamimura et al. ........... 358/1.9 |
| 2007/0076273 A1 * | 4/2007 | Viturro et al. ............... 358/504 |
| 2008/0007802 A1 * | 1/2008 | Viturro et al. ............... 358/504 |
| 2008/0198392 A1 * | 8/2008 | Moriyama ................... 358/1.9 |

FOREIGN PATENT DOCUMENTS

| JP | 2000-033732 | 2/2000 |
| JP | 2003-94732 | 4/2003 |
| JP | 2003-116017 | 4/2003 |
| JP | 2003-274199 | 9/2003 |

* cited by examiner

*Primary Examiner*—Scott A Rogers
(74) *Attorney, Agent, or Firm*—Fulbright & Jaworksi L.L.P.

(57) ABSTRACT

A color chart and a grayscale chart are output, and a calibration task of calculating a correction amount based on the grayscale chart by comparing a measured density value that is obtained by measuring a density of the grayscale chart and a target density value that has been found in advance, is repeated until the correction amount based on the grayscale chart is equal to or less than a first tolerance value, and at this time, as long as the correction amount based on the grayscale chart is equal to or greater than a second tolerance value that is larger than the first tolerance value, a correction amount based on the color chart is additionally calculated by comparing a measured density value that is obtained by measuring a density of the color chart and a target density value that has been found in advance, and this correction amount is used in place of the correction amount based on the grayscale chart.

4 Claims, 6 Drawing Sheets

US 7,542,168 B2

GRADATION CONVERSION CALIBRATION BY COMPARING GRAYSCALE AND COLOR CHART MEASUREMENTS TO TARGET VALUES AND REPEATED CORRECTION AMOUNT CALCULATIONS TO TOLERANCE VALUES

This application claims priority from Japanese Patent Application No. JP 2005-114635 filed Apr. 12, 2005 herein incorporated by reference in its entirety.

BACKGROUND OF THE INVENTION

1. Field of the Invention

The present invention relates to gradation conversion calibration methods, and gradation conversion calibration modules using the same, for determining a correction amount to be used when converting the image data gradation to the print data gradation in image forming devices that print color images by forming them on recording media.

2. Description of the Related Art

The use of color charts made of test images for each of the three basic colors that are used to create a color image to perform gradation conversion calibration processing (also called uniformity correction processing) in order to determine the correction amount to use when converting the image data gradation to the print data gradation suited for the printer being used is known (for example, JP 2000-33732A (paragraph numbers 0062 through 0072, FIG. 12 and FIG. 13)). With the gradation conversion calibration processing according to Patent Document 1, first an image recording device prints a test chart image for calibration in which patches of the three basic colors, such as C (cyan), M (magenta), and Y (yellow), have been recorded, then the density of each patch of the test chart image is measured using a density measurement device, and then, based on the measured density values and the target density values to be reproduced, the image data conversion conditions under which the input image data are converted to an output image signal (print data) are determined in such a manner that proper image recording can be performed so that a desired image density can be reproduced from the input image data.

The use of a grayscale chart made of grayscale test images that are obtained by combining each color of the three basic colors to perform gradation conversion calibration processing to determine the correction amount to use when converting the image data gradation to that for print data that are suited for the printer being used also is known (for example, JP 2003-94732A (paragraph numbers 0033-0034, FIGS. 5 and 6).

Since there are different advantages and disadvantages to gradation conversion calibration employing a color chart and gradation conversion calibration employing a grayscale chart, there are also known gradation conversion calibration processing methods in which both a color chart and a grayscale chart are used (for example, JP 2003-274199A (paragraph numbers 0020 to 0027, FIGS. 3 and 4)). In this gradation conversion calibration, a test print furnished with single color patches in 21 steps for each color C, M, Y, and K, and grayscale patches in 13 steps, is printed, and the operator for example sets parameters in the I/O relationship of the grayscale patches and the I/O relationship of the single color patches that determine whether or not to give priority to the grayscale balance or give priority to the hue of the individual colors, so as to determine the gradation correction data, and the gradation correction data that are determined are suitably interpolated so that they may be stored on a gradation correction curve storage portion as a gradation correction curve.

In addition to these, there also is known a technology in which the gradation conversion table that is obtained using the color chart and the gradation conversion table that is obtained using the grayscale chart are utilized at a ratio that is appropriate for the image data while using weighting coefficients (for example, JP 2003-116017A, (paragraph numbers 0008 to 0012, FIG. 8)).

When calibration is performed using the color chart in the case of gradation conversion calibration on a dot laser printer, for example, in which a plurality of optical elements that are arranged in a line array are controlled according to the exposure gradation value based on the print data to expose a light-sensitive material, initially it is possible to obtain the result of a quick convergence, however, this convergence value is relatively inaccurate, and the final image quality that is obtained tends to be worse than when calibration is performed using a grayscale chart. This is thought to occur due to shifting in the registration (misregistration) and improper coloring (where changes in specific colors affect other colors as well). However, performing calibration using a grayscale chart has the problem that the number of repeats that are performed before convergence is achieved is large. In addition to this, providing both a gradation conversion table that is obtained using the color chart and a gradation conversion table that is obtained using the grayscale chart is disadvantageous in terms of cost and in terms of the time required for the calibration task.

SUMMARY OF THE INVENTION

The invention was arrived at in light of the foregoing matters, and it is an object thereof to provide technology in the field of gradation conversion calibration processing for determining a correction amount to be used when converting the image data gradation to the print data gradation, the technology being for converging the difference between a target value and a measured value that is obtained from a test print to a tolerance value in a small number of calibrations.

To achieve the above object, a gradation conversion calibration method of the present invention is for determining a correction amount to be used when converting an image data gradation to a print data gradation in an image forming device that forms color images on recording media and outputs these, and includes the steps of outputting a color chart made of test images for each basic color of three basic colors for creating a color image, and a grayscale chart made of a test image that combines each basic color of the three basic colors, and repeating a calibration task of calculating a correction amount based on the grayscale chart by comparing a measured density value that has been obtained by measuring a density of the grayscale chart with a target density value that has been found in advance, until the correction amount based on the grayscale chart is equal to or less than a first tolerance value;

and at this time, as long as the correction amount based on the grayscale chart is equal to or greater than a second tolerance value that is larger than the first tolerance value, a correction amount based on the color chart is additionally calculated by comparing a measured density value that has been obtained by measuring a density of the color chart and a target density value that has been found in advance, and this correction amount is used in place of the correction amount based on the grayscale chart.

According to the gradation conversion calibration method of the invention, a color chart and a grayscale chart are output, and initially the correction amount for gradation conversion is calculated by comparing a target density value and a measured density value based on the grayscale chart, but if the correction value on the grayscale chart is equal to or greater than a second tolerance value that is larger than the first tolerance value, then the correction amount for gradation conversion is calculated by comparing a target density value and a measured density value based on the color chart. Here, the second tolerance value is the value of a level at which it is expected that many repeats of the calibration task are necessary before the difference between the measured value and the target value sufficiently converge. It should be noted that if the correction value based on the grayscale chart falls below the second tolerance value in subsequent repeats of the calibration task, then the difference between the measured value and the target value is converged until a correction amount that is equal to or less than the first tolerance value is ultimately obtained in calibration employing the grayscale chart. Here, the first tolerance value expresses the allowable range for the correction amount that can be expected to yield a high-quality print image. Consequently, in this invention, gradation conversion calibration based on the grayscale chart is the default state, however, if the correction amount that has been calculated is equal to or greater than the second tolerance value, then temporarily switching to gradation conversion calibration based on the color chart allows an appropriate correction amount with which a high-quality print image can be printed to be obtained in a small number of repeats.

It should be noted that the target value in the grayscale chart and the target value in the color chart that are handled in the invention can be target density values that have been experimentally determined in advance for each image forming device or for each type of recording medium, or they can be the mean value of the measured density values of each chart that are obtained using through the test print, or computed density values that are calculated based on this mean density value. In the invention there are no limitations on the method for obtaining the target value.

In this gradation conversion calibration method, depending on the calculated correction amount it may be necessary to switch from gradation conversion calibration based on the grayscale chart to gradation conversion calibration based on the color chart, and thus to perform this process efficiently, one favorable embodiment of the invention is for the color chart and the grayscale chart to be formed side by side on the same test print. In this embodiment, a single test print that is output includes both the color chart and the grayscale chart, and this allows inefficient situations such as reprinting a test print this has been furnished with the color chart when switching to gradation conversion calibration based on the color chart to be avoided.

A gradation conversion calibration module for determining a correction amount using the gradation conversion calibration method according to the invention is furnished with a test print output management portion that outputs a color chart made of a test image for each basic color of three basic colors for creating a color image, and a grayscale chart made of a test image that combines each basic color of the three basic colors, a gradation conversion calibration execution portion that is furnished with a grayscale chart calibration mode for calculating a correction amount based on the grayscale chart by comparing a measured density value that has been obtained by measuring a density of the grayscale chart and a target density value that has been found in advance, and a color chart calibration mode for calculating a correction amount based on the color chart by comparing a measured density value that has been obtained by measuring a density of the color chart and a target density value that has been found in advance, a correction amount management portion that sets the calculated correction amount to a correction table as a final correction amount if the calculated correction amount is equal to or less than a first tolerance value, and a calibration mode switch portion that switches to gradation conversion calibration according to the color chart calibration mode if the correction amount based on the grayscale chart is equal to or greater than a second tolerance value that is larger than the first tolerance value.

With the gradation conversion calibration module having this configuration, both a grayscale chart calibration mode for executing gradation conversion calibration based on the grayscale chart and a color chart calibration mode for executing gradation conversion calibration based on the color chart are prepared, and when the correction amount that has been calculated through gradation conversion calibration is below a second tolerance value that is larger than the first tolerance value, then gradation conversion calibration is continued in the grayscale chart calibration mode, but if the correction amount based on the grayscale chart is equal to or greater than the second tolerance value, then the calibration is switched to gradation conversion calibration in the calibration mode based on the color chart, and gradation conversion calibration in the calibration mode based on the color chart is executed until a correction amount that is less than the second tolerance value is calculated. Thus, the gradation conversion calibration mode based on the grayscale chart is the default mode, however, if the calculated correction amount is equal to or greater than the second tolerance value, then by temporarily switching to the gradation conversion calibration mode based on the color chart, it is possible to obtain an appropriate correction amount with which a high-quality print image can be output in a small number of repeats.

As mentioned above, forming the color chart and the grayscale chart on a single test print obviates inefficient situations such as reprinting a test print that has been furnished with the color chart when switching from the gradation conversion calibration mode based on the grayscale chart to the gradation conversion calibration mode based on the color chart, and thus, one favorable embodiment of the gradation conversion calibration module of the invention is for the test print output management portion to be configured such that it outputs test prints in which the color chart and the grayscale chart are formed lined up on the same test print.

Other features and advantages of the invention will become clear through the following description of the embodiments with reference to the drawings.

DETAILED DESCRIPTION OF THE PREFERRED EMBODIMENTS

Embodiments of the invention are described below with reference to the drawings.

Figure 1:
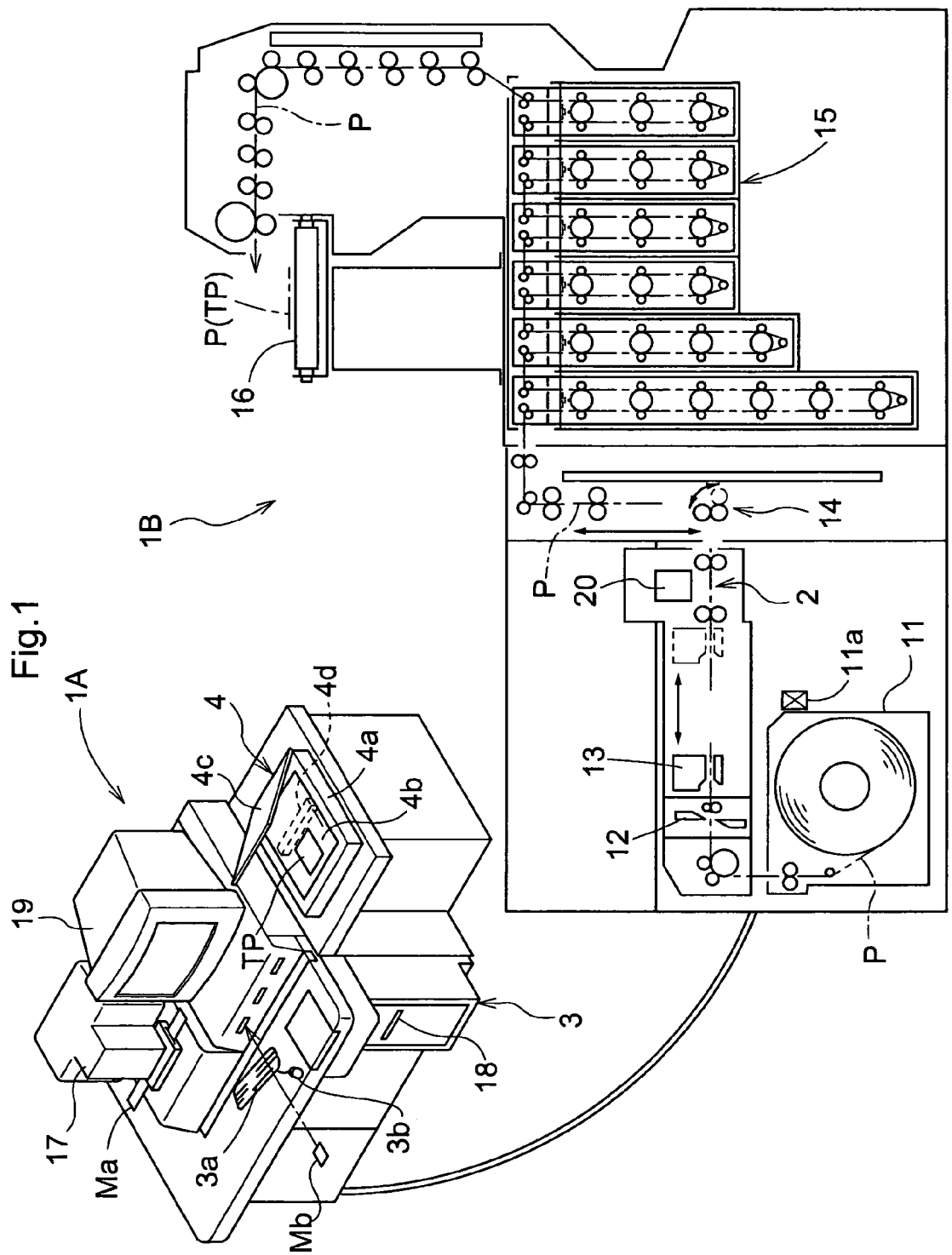
FIG. 1 is a schematic view of the external appearance of a digital laser printer that has incorporated the gradation conversion calibration module of the invention.

FIG. 1 shows a digital laser printer that serves as an image forming device that has incorporated the gradation conversion calibration module according to the invention. This digital laser printer may also be referred to as a digital minilab, and is made of a print station 1B that exposes and develops a print paper P, which is one example of a recording medium, and an operation station 1A that performs appropriate image processing on captured image data that have been obtained from image recording media such as developed photographic film Ma or a digital camera memory card Mb and then transfers these to the print station 1B.

The print station 1B draws out roll-type print paper P that is stored in a print paper magazine 11, cuts this to the print size with a short cutter 12 and sends the cut print paper P horizontally with a paper-sandwiching type horizontal carrying device 13 to an exposure unit 2, where the print paper P is carried in the sub-scanning direction (horizontal carrying direction) while the capture image(s) is exposed on the surface of the print paper P by light radiated from a laser print head 20 in the exposure unit 2. After exposure, the print paper P is flipped over by a vertical carrying device 14 and carried upward into a processing drum unit 15 that has a plurality of developing drums, where it is developed. After drying, a horizontal conveyor 16 on an upper part of the device carries the print paper P to a sorter, which is not shown in the drawings, where the print paper P that is, photographic print is sorted by customer order. A test print sheet TP, which will be described in greater later, that is used when performing gradation conversion calibration (uniformity correction) for the laser print head 20 is produced in the same way as the photographic print P, except in the case of the test print sheet TP, in which a test image is exposed and formed in lieu of a captured image.

It should be noted that a mounting portion to which the print paper magazine 11 is mounted is provided with an ID code reader 11a for reading the print paper ID code that has been added to the print paper magazine 11. The print paper ID code uniquely identifies the print paper P type, and by recognizing the print paper ID code, it is possible to know the type of print paper P that is stored in the print paper magazine 11, that is, the type of print paper P that is used by the printer.

A film scanner 17 that can obtain image data from captured image frames in the photographic film Ma is disposed on an upper portion of the desk-shaped console of the operation station 1A, and a media reader 18 that obtains captured images from, for example, CD-Rs or various types of memory cards that have been used as a captured image recording medium Mb inserted into a digital camera or the like, is incorporated as an external input device for a general personal computer that functions as a controller 3 of the digital laser printer. The controller 3 is connected to a monitor 19 for displaying various information and a keyboard 3a and a mouse 3b serving as operation input devices that are employed as the operation input portions used when performing the various settings and adjustments, and although not shown in the drawings, the controller 3 is also provided with USB and IEEE 1394 connection ports that serve as interfaces for directly transferring image data from a digital camera, for example.

The controller 3 is also connected to an image reading device that functions as a density meter that is used during gradation conversion calibration for the laser print head 20, and here this is a flatbed scanner 4. The flatbed scanner 4 is provided with a main unit 4a in which is formed an original document platen 4b made of transparent glass or resin, an openable cover 4c that covers the original document platen 4b from above, and a scanner portion 4d that is capable of parallel movement within the main unit 4a. The scanner portion 4d is provided with a light source, and a photoelectric transducer such as a CCD, that extend in the main scanning direction, and can move back and forth in the sub-scanning direction, which is perpendicular to the main scanning direction.

Figure 2:
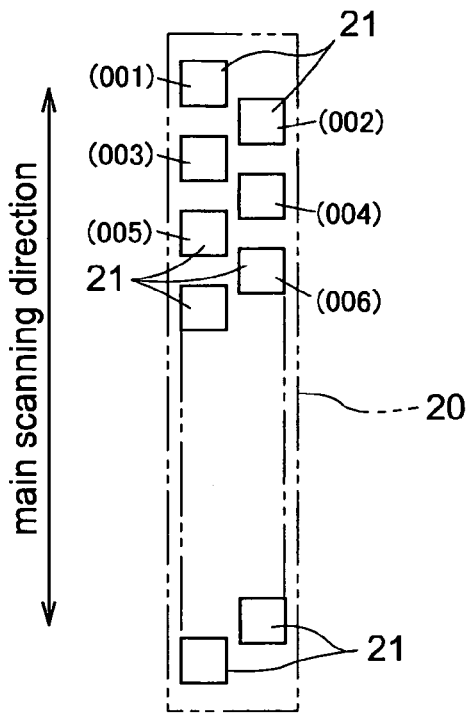
FIG. 2 is an explanatory diagram showing the arrangement of the light-emitting elements in the laser print head.

The laser print head 20 is made of three print head units each of which emits the three basic colors R (red), G (green), and B (blue) downward, and as schematically shown in FIG. 2, each print head unit is constituted by a linear array made of a plurality of optical elements 21 lined up in the main scanning direction in a two-column staggered pattern. In this embodiment, self-emitting type fluorescent light-emitting elements (hereinafter, this will be referred to simply as light-emitting element) 21 are used as the optical elements 21. The laser light that is emitted from the light-emitting elements 21 passes through a filter corresponding to R (red), G (green), or B (blue) to obtain light corresponding to the three basic colors. The luminance of the light that is emitted by the light-emitting elements 21 is controlled by adjusting the voltage that is applied to the electrodes corresponding the respective light-emitting element 21. Of course, it is also possible to adopt a laser print head 20 that partially or completely uses LEDs in lieu of fluorescent light-emitting elements as the light-emitting elements 21, and it is also possible to adopt other laser print heads 20, such as liquid crystal shutter-type laser print heads.

Figure 3:
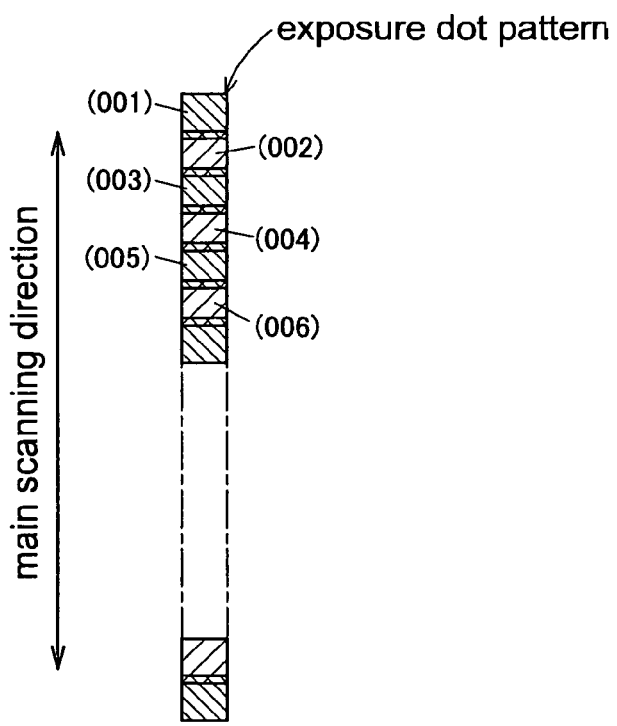
FIG. 3 is an explanatory diagram showing the linear exposure dot pattern produced by the laser print head.

Here, the light-emitting elements 21 that are lined up in the linear array are divided into light-emitting elements 21 that have been assigned odd numbers and belong to the left column in FIG. 2, and light-emitting elements 21 that have been assigned even numbers and belong to the right column in FIG. 2, and for example, to form one line in the main scanning direction on the print paper P using the light-emitting elements 21 of the left and right columns, exposure is performed controlling the emission timing of the light-emitting elements that have been assigned an odd number and the light-emitting elements that have been assigned an even number. The light-emitting elements are disposed so that at this time, as shown in FIG. 3, the dots that are formed by the emission of light from the light-emitting elements 21 that have been assigned an odd number (the exposure region denoted by odd numbers in parentheses) and the dots that are formed by the emission of light from the light-emitting elements 21 that have been assigned an even number (the exposure region denoted by even numbers in parentheses) slightly overlap in the main scanning direction.

To expose the image, the print paper P is moved in the sub-scanning direction relative to the light from the laser print head 20, or more correctly, the light-emitting elements 21 that are arranged in a linear array in the main scanning direction, and in synchronization with this relative movement, print control signals that correspond to the exposure gradation value of each color RGB color based on the image data are sent to the laser print head 20 for each color, and these cause the light-emitting elements 21 of the print head 20 to emit light only during a predetermined exposure time to form exposure dots having a predetermined gradation that corresponds to that light-emitting element 21 on the print paper 3. As mentioned above, at this time the light-emitting elements 21 that have been given an odd number and the light-emitting elements 21 that have been given an even number radiate light at a timing that is staggered by a predetermined amount of time, so that the two rows of staggered light-emitting elements 21 expose the print paper P in lines at one exposure dot width, and by performing control so that the exposure dots that are formed by the light-emitting elements 21 corresponding to the laser print head 20 of each color overlap, full-color exposure dots are formed on the print paper P. By exposing these color lines on the print paper P while moving the print paper P in the sub-scanning direction relative to the laser print heads 20, the entire latent image that corresponds to the image to be printed on the surface of the print paper P is formed.

The emission properties of the light-emission elements 21 must be adjusted using a correction amount determined by gradation conversion calibration of the duration of the drive signals that are applied to the light-emission elements 21, in order to compensate for luminance nonuniformities (that is, the amount of light from each light-emitting element 21 is not the same even if they are operated to emit light based on the same exposure gradation value, and therefore the exposure dots have different densities) due to variation among the emission properties of the fluorescent bodies themselves making up the light-emitting elements, the emission area of the fluorescent bodies, or the distance between electrodes. Further, since luminance nonuniformities also occur due to temporal fluctuations in the emission properties, the gradation conversion calibration task is performed each morning when the machine is powered up, as well as each time that the type of print paper P that is used is changed, since there is a possibility that the exposure dots that are formed will have different densities when a different type of print paper P is used, even if the light amount remains the same.

Figure 4:
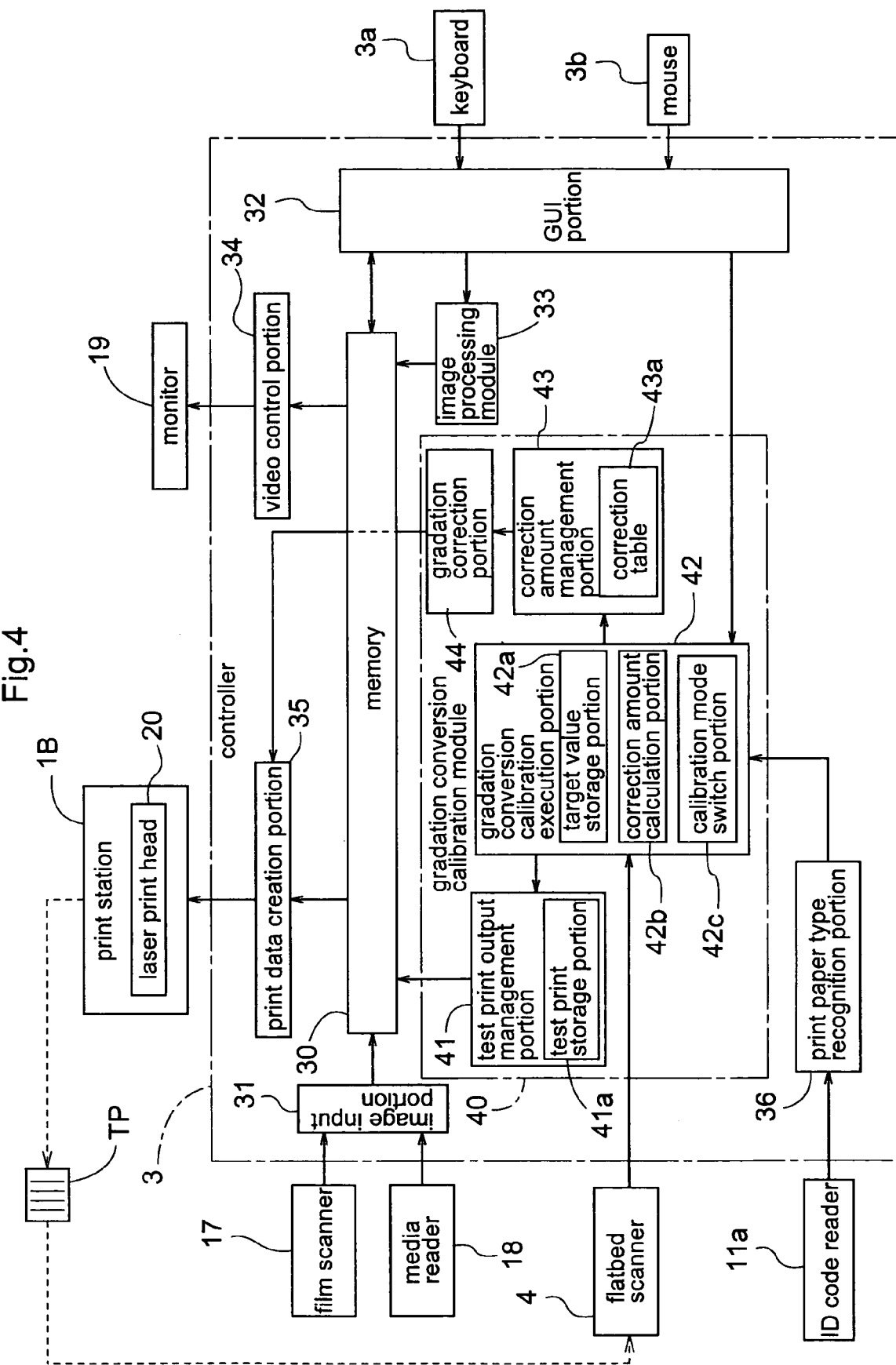
FIG. 4 is a functional block diagram for the controller of the digital laser printer of FIG. 1.

The controller 3 of this digital laser printer has CPU as a central member that is constituted by function portions made of hardware or software, or both, for performing various types of processing in order to print photograph prints, such as various types of correction including gradation correction and color correction, and filter image processing such as border enhancement and shading, and as shown in FIG. 4, examples of function portions that are particularly relevant to the present invention include an image input portion 31 that takes in image data that have been obtained by the film scanner 17 or the media reader 18 and transfers these to a memory 30 for subsequent processing, a gradation conversion calibration module 40 that performs gradation conversion calibration based on the density data that are obtained using the flatbed scanner 4, which serves as a density meter, from the light and dark patches formed on the test print sheet TP that is output by the digital laser printer as a test print, a GUI portion 32 that constitutes a graphic user interface (hereinafter abbreviated as GUI) for creating graphic operation screens that include various windows and various operation buttons, for example, and creating control commands from user input through such a graphic operation screens (via a keyboard 3a or a pointing device such as a mouse 3b), an image processing module 33 for performing various image processing on the image data in the memory 30, a video control portion 34 for creating a video signal for displaying, on a monitor 19, the captured frame images based on the image data in the memory 30 or graphic data that have been sent from the GUI portion 32, a print data creation portion 35 for creating print data that are suited for the laser print heads 20 provided in the exposure unit 2 of the print station 1B based on the processed image data, and a print paper type recognition portion 36 for specifying the type of the print paper stored in the print paper magazine 11 that is currently loaded from the print paper ID code that has been read by the ID code reader 11a.

The important functions of the image processing module 33 are to perform fine color correction, trimming, and filtering for attaining special effects, on the image data in the memory 30 based on commands from the operator. Thus, the image processing module 33 is provided with a prejudging portion that controls a prejudge task of ordering correction while specifying specific captured frame images, and an image processing portion that can perform various types of image processing. It should be noted that in the prejudge task it is possible to specify whether or not to print each of the captured frame images, the number of prints, and the print size. The image processing portion also includes a function for creating simulated images of the expected print image to be displayed on a monitor 23 when performing the prejudge task.

The gradation conversion calibration module 40 includes a test print output management portion 41, a gradation conversion calibration execution portion 42, a correction amount management portion 43, and a gradation correction portion 44. The test print output management portion 41 outputs, through the print station 1B, a test print TP on which are formed two charts, a color chart made of a test image for each of the three basic colors used to create color images and a grayscale chart made of a test image that combines the three basic colors. The gradation conversion calibration execution portion 42 is furnished with a grayscale chart calibration mode of calculating a correction amount based on the grayscale chart by comparing the measured density values obtained by measuring the density of the grayscale chart and target density values that have been found in advance, and a color chart calibration mode of calculating correction amounts that are based on the color chart by comparing the measured density values obtained by measuring the density of the color chart and target density values that have been found in advance. The correction amount management portion 43 sets the final correction amount for each light-emitting element determined by the gradation conversion calibration execution portion 42 (in general, this is a correction factor or a correction coefficient) in a correction table 43a. The gradation correction portion 44 uses correction amounts that have been read from the correction table 43a to correct the exposure gradation values that are given to the laser print head 20 based on the image data.

Figure 5:
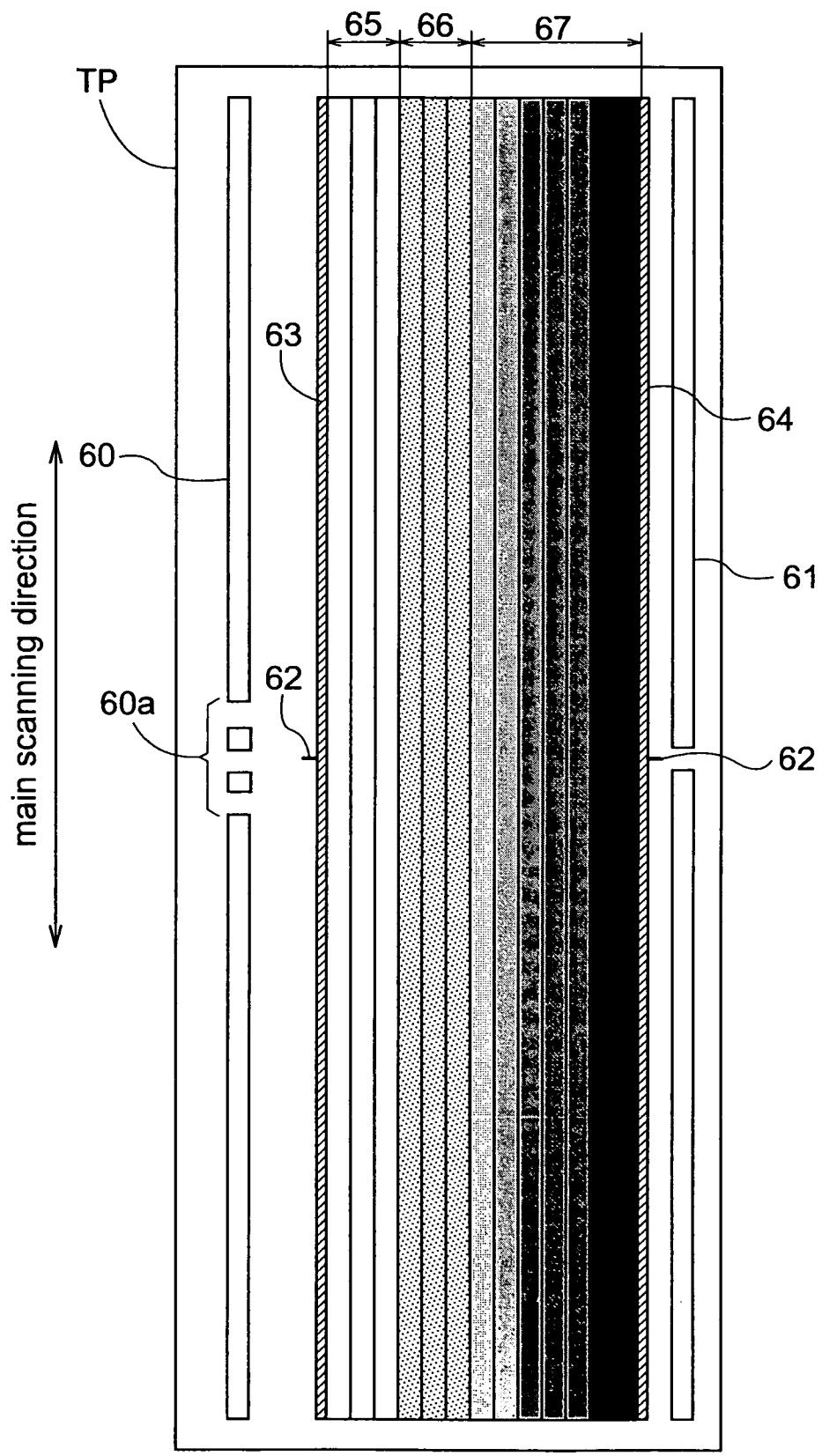
FIG. 5 is a plan view of the test print.

The test print output management portion 41 is provided with a test print data storage portion 41a that stores image data for printing the test print TP, on which the color chart and the grayscale chart are formed, and when performing gradation conversion calibration, the gradation of the image data for the test print that have been read from the test print data storage portion 41a is corrected by the gradation correction portion 44 to convert these data into print data, which are then transferred from the print data creation portion 35 to the laser print head 20. FIG. 5 shows an example of a test print TP that has been output by the print station 1B in this manner. This test print TP includes a plurality of rows of thin, long exposure bars formed extending in the main scanning direction, which is the direction of the linear array of the light-emitting elements 21. The exposure bars include a start bar 60 that functions as an index that indicates the front end of the chart and includes a code pattern portion 60a that shows the print paper type, an end bar 61 that indicates the rear end of the chart, and a chart bar group that is disposed between the start bar 60 and the end bar 61. The ends of the chart bar group are constituted by an odd pixel line portion 63 that is made of exposure dots from only the light-emitting elements 21 that have been assigned odd numbers and an even pixel line portion 64 that is made of exposure dots from only the light-emitting elements 21 that have been assigned even numbers, and a center indicator 62 is formed at a central position in the main scanning direction in each of these. The main region of the chart bar group is divided into a color chart region 65, an improperly colored region 66, and a grayscale chart region 67. In the color chart region 65 are disposed three color bars of Y (yellow), M (magenta), and C (cyan) each of which is made of an exposure dot group that has been formed by individually irradiating the three light-emitting elements 21 for B (blue), G (green), and R (red), and the color chart region 65 is used as the color chart. The improperly colored region 66 includes three bars that are created by changing only the gradation value of a light-emitting element 21 of specific color from among B (blue), G (green), and R (red) in order from the gradation value for generating the intermediate grayscale value. The grayscale chart region 67 includes seven bars that are made of seven shades of gray from white to black, and this is used as the grayscale chart.

The gradation conversion calibration execution portion 42 is provided with a target value storage portion 42a that stores the target values that are used in the grayscale chart calibration mode and the color chart calibration mode, a correction amount calculation portion 42b that calculates the correction amount in the grayscale chart calibration mode and the color chart calibration mode, and a calibration mode switch portion 42c that switches to gradation conversion calibration according to the color chart calibration mode if the correction amount that has been calculated in the grayscale chart calibration mode is equal to or greater than a second tolerance value that is larger than a first tolerance value, which expresses a sufficient calibration result.

The target values that are stored in the target value storage portion 42a can be target density values that have been experimentally determined in advance for the laser digital printer or based on the print paper P type, or can be mean values of the measured density value of, each chart that are obtained through the test print that is printed in the gradation conversion calibration operation or a computed density value that is calculated based on the mean density values.

The second tolerance value is the value of a level that requires many repeats of the calibration task before the difference between the measured value and the target value sufficiently converges, and is a value that has been experimentally, and by experience, shown to require calibration to be performed many times before the correction amount is converged to within the first tolerance value when the correction amount is the second tolerance value or higher and calibration is performed based on the grayscale chart. The first tolerance value expresses the allowable range of a correction amount with which the printing of a high-quality print image can be expected, and represents the conditions under which the gradation conversion calibration is acceptable.

Figure 6:
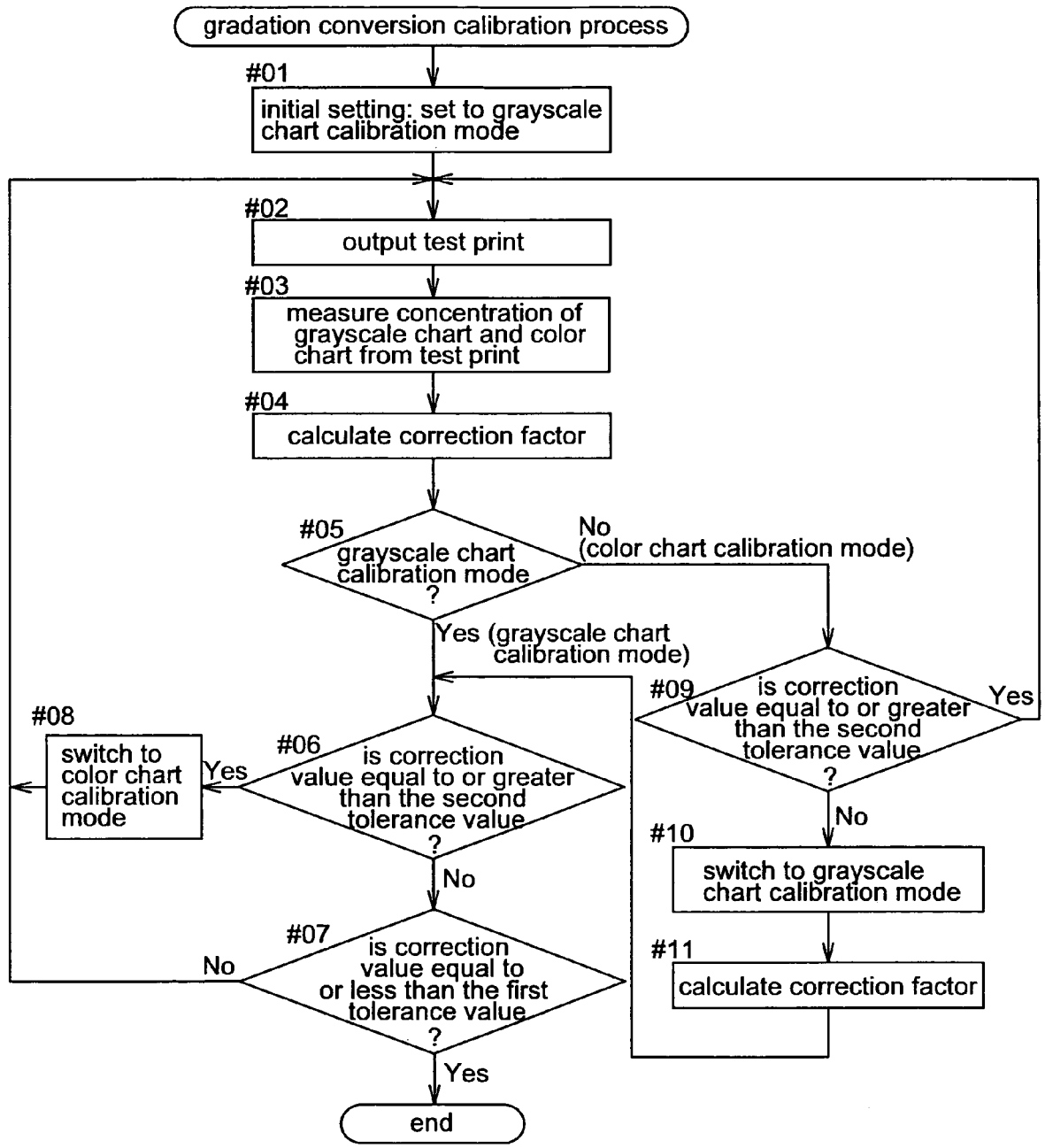
FIG. 6 is a flowchart illustrating the gradation conversion calibration task.

The flowchart of FIG. 6 is used to describe the typical flow of the gradation conversion calibration process in the digital laser printer. It should be noted that here a correction factor used to obtain a corrected gradation value by multiplying the reference gradation value by it is adopted as the correction amount, but it is also possible to use a correction amount in another form.

First, the gradation conversion calibration execution portion 42 is set to the grayscale chart calibration mode as the initial setting (#01). Then, the image data for the test print are read from the test print data storage portion 41a of the test print output management portion 41, their gradation is corrected using the correction factor that is currently set in the correction table 43a in the gradation correction portion 44, and then these processed image data are converted into print data (output signal) by the print data creation portion 35, and the laser print head 20 is driven based on this output signal to expose the print paper P. The exposed print paper P is developed by the developing portion 15, dried, and then discharged onto the horizontal conveyor 16 as a test print sheet TP that has a color chart and a grayscale chart (#02).

The test print sheet TP thus created is placed in the flatbed scanner 4, which serves as a density meter, the patches of the color chart and the grayscale chart formed in the test print sheet TP are measured and those measured density values are transferred to the gradation conversion calibration execution portion 42 of the gradation conversion calibration module 40 (#03). The correction amount calculation portion 42b calculates the correction factor by comparing the target value for the grayscale chart, or the target value for the color chart, that it has read from the target value storage portion 42c based on the calibration mode that has been set, and the corresponding measured density value (#04). It should be noted that when the gradation conversion calibration process is started, the gradation conversion calibration execution portion 42 has been set to the grayscale chart calibration mode, and thus the correction factor is calculated by comparing the target value for the grayscale chart with the measured density value of the grayscale chart. Next, a check is performed to determine whether the gradation conversion calibration execution portion 42 is as this point set to the grayscale chart calibration mode or the color chart calibration mode (#05).

If the calibration mode that has been set is the grayscale chart calibration mode (Yes branch of #05), then whether or not the calculated correction factor is for example at least 4% greater than the previously set threshold value (in this specification, referred to as the second tolerance value) is determined (#06). It should be noted that the correction factor is calculated for each light-emitting element 21, and if all of the correction factors are below the second tolerance value (No branch of #06), then a check is performed to determine whether that correction factor or the total value calculated from all of the correction factors is equal to or less than the first tolerance value, which is more stringent than the second tolerance value (#07), and if equal to or less than the first tolerance value (Yes branch of #07), then the correction factor is taken as the final correction factor and the calibration process is ended, and if greater than the first tolerance value (No branch of #07), then it is determined that further calibration is necessary, and the procedure is returned to step #02 and a test print using this calculated correction factor is printed. If even one of the calculated correction factors is found to be equal to or greater than the second tolerance value in step #06 (Yes branch of #06), then the calibration mode switch portion 42c switches the calibration mode of the gradation conversion calibration execution portion 42 to the color chart calibration mode, and the procedure is returned to step #02 in order to continue the calibration process.

A check is performed to determine whether or not the calculated correction factor is equal to or greater than the second tolerance value (#09) even if it is found in step #05 that the calibration mode that has been set is the color chart calibration mode (No branch of #05). If the calculated correction factor is equal to or greater than the second tolerance value (Yes branch of #09), then it is determined that further calibration is necessary, and the procedure is returned to step #02 and a test print using this calculated correction factor is printed. If the calculated correction factor is under the second tolerance value (No branch of #09), then the calibration mode switch portion 42c switches the calibration mode of the gradation conversion calibration execution portion 42 to the grayscale chart calibration mode (#10). Consequently, the correction amount calculation portion 42b reads the target value for the grayscale chart from the target value storage portion 42c and compares this target value with the measured density value of the grayscale chart that has already been obtained in order to calculate the correction factor (#11). The correction factor is calculated based on this grayscale chart is then checked like in step #06.

Figure 7:
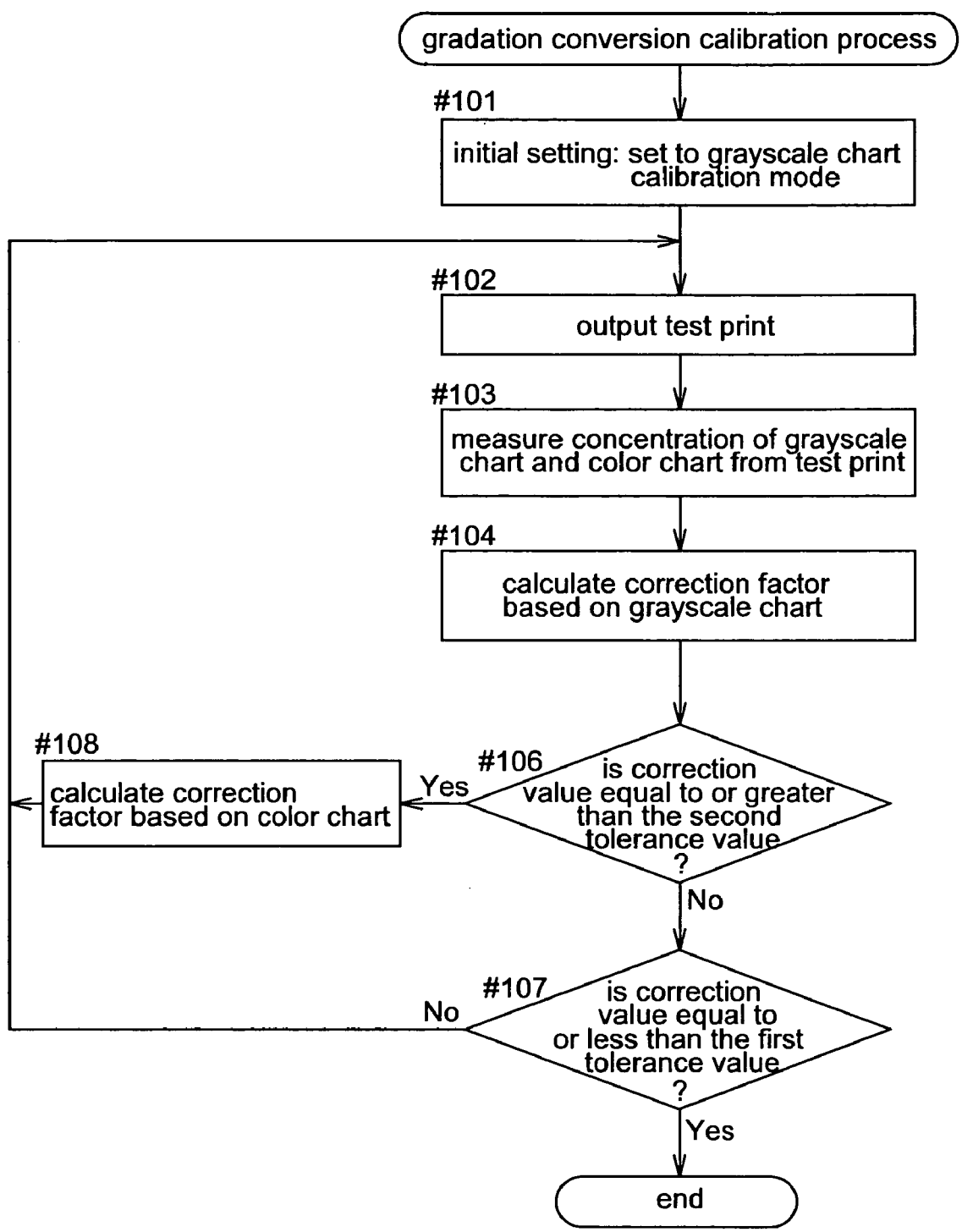
FIG. 7 is a flowchart illustrating a separate gradation conversion calibration task.

The flowchart of FIG. 7 shows the flow of the above gradation conversion calibration processing in separate implementation. Here as well, first the gradation conversion calibration execution portion 42 is set to the grayscale chart calibration mode as an initial setting (#101). Then, the image data for the test print are read from the test print data storage portion 41a of the test print output management portion 41, their gradation is corrected using the correction factor that is currently set in the correction table 43a in the gradation correction portion 44, and then these processed image data are converted into print data (output signal) by the print data creation portion 35, and the laser print head 20 is driven based on this output signal to expose the print paper P. The exposed print paper P is developed by the developing portion 15, dried, and then discharged onto the horizontal conveyor 16 as a test print sheet TP that has a color chart and a grayscale chart (#102).

The test print sheet TP thus created is placed in the flatbed scanner 4, which serves as a density meter, the patches in the grayscale chart formed in the test print sheet TP are measured for the grayscale chart calibration mode, the patches in the color chart are measured for the color chart calibration mode, and the measured density values of the calibration modes are transferred to the gradation conversion calibration execution portion 42 of the gradation conversion calibration module 40 (#103).

The correction amount calculation portion 42b first calculates a correction factor based on the grayscale chart by comparing the target value for the grayscale chart that it has read from the target value storage portion 42c based on the grayscale chart calibration mode, and the corresponding measured density value (#104). Next, a check is performed to determine whether or not the calculated correction factor is for example at least 4% greater than the previously set threshold value (in this specification, referred to as the second tolerance value) (#106). It should be noted that this correction factor is calculated for each light-emitting element 21, and if all of the correction factors are below the second tolerance value (No branch of #106), then a check is performed to determine whether that correction factor or the total value calculated from all of the correction factors is equal to or less than the first tolerance value, which is more stringent than the second tolerance value (#107), and if equal to or less than the first tolerance value (Yes branch of #107), then the correction factor is taken as the final correction factor and the calibration process is ended. If the correction factor is found to be greater than the first tolerance value in the check of step #107 (No branch of #107), then it is determined that it is necessary to continue the calibration process, and the procedure is returned to step #102 and a test print using this calculated correction factor is printed.

If even one of the calculated correction factors is found to be equal to or greater than the second tolerance value in step #106 (Yes branch of #106), then the correction amount calculation portion 42b calculates the correction factor based on the color chart by comparing the target value for the color chart that it has read from the target value storage portion 42c based on the color chart calibration mode, and the corresponding measured density value (#108), and then the procedure is returned to step #102 in order to continue the calibration process and a test print is printed using this calculated correction factor based on the color chart.

It can be understood from the above description of the two flowcharts that in this gradation conversion calibration process, the gradation conversion calibration mode based on the grayscale chart is the default mode, but if the correction amount that has been calculated is equal to or greater than the second tolerance value, then the gradation conversion calibration mode can temporarily be switched to the mode based on the color chart, and by doing this, an appropriate correction amount that allows a high-quality print image to be printed can be obtained through a small number of repeats.

The gradation conversion calibration technology according to the invention can be adopted by all image forming devices that require a calibration task that involves repeatedly performing test printings to find a correction amount to use when converting the image data gradation to the print data gradation, and the type of print head and the type of recording medium, for example, are not limited to the those described in the above embodiment.

The invention claimed is:

1. A gradation conversion calibration method of determining a correction amount to be used when converting an image data gradation to a print data gradation in an image forming device that outputs color images by forming them on recording media, said method comprising the steps of:
   outputting a color chart made of a test image for each basic color of three basic colors for creating a color image, and a grayscale chart made of a test image that combines each basic color of said three basic colors; and
   repeating a calibration task of calculating a correction amount based on the grayscale chart by comparing a measured density value that has been obtained by measuring a density of said grayscale chart with a target density value that has been found in advance, until said correction amount based on the grayscale chart is equal to or less than a first tolerance value;
   wherein as long as said correction amount based on the grayscale chart is equal to or greater than a second tolerance value that is larger than said first tolerance value, a correction amount based on said color chart is additionally calculated by comparing a measured density value that has been obtained by measuring a density of said color chart and a target density value that has been found in advance, and this correction amount is used in place of said correction amount based on the grayscale chart.

2. The method according to claim 1,
   wherein said color chart and said grayscale chart are formed lined up on a same test print.

3. A gradation conversion calibration module that determines a correction amount to be used when converting an image data gradation to a print data gradation in an image forming device that prints color images by forming them on recording media, comprising:
   a test print output management portion that outputs a color chart made of a test image for each basic color of three basic colors for creating a color image, and a grayscale chart made of a test image that combines each basic color of said three basic colors;
   a gradation conversion calibration execution portion that is furnished with a grayscale chart calibration mode for calculating a correction amount based on the grayscale chart by comparing a measured density value that has been obtained by measuring a density of said grayscale chart and a target density value that has been found in advance, and a color chart calibration mode for calculating a correction amount based on the color chart by comparing a measured density value that has been obtained by measuring a density of said color chart and a target density value that has been found in advance;

a correction amount management portion that sets said calculated correction amount in a correction table as a final correction amount if said calculated correction amount is equal to or less than a first tolerance value; and a calibration mode switch portion that switches to gradation conversion calibration according to said color chart calibration mode if said correction amount based on the grayscale chart is equal to or greater than a second tolerance value that is larger than said first tolerance value.

4. The module according to claim 3, wherein said test print output management portion outputs the test print in such a manner that said color chart and said grayscale chart are formed lined up on a same test print.

* * * * *